J. SMITH.
HUB FOR CARRIAGES, &c.

No. 14,294.  Patented Feb. 19, 1856.

UNITED STATES PATENT OFFICE.

JOS. SMITH, OF SUNBURY, OHIO.

HUB FOR CARRIAGES.

Specification of Letters Patent No. 14,294, dated February 19, 1856.

*To all whom it may concern:*

Be it known that I, JOSEPH SMITH, of Sunbury, in the county of Delaware and State of Ohio, have invented an Improvement in Hubs for Carriages, &c., and that the following is a full, clear, and exact description of the principle or character which distinguishes it from all other things before known and the usual manner of making, modifying, and using the same, reference being had to the annexed drawings, of which—

Figure 2:
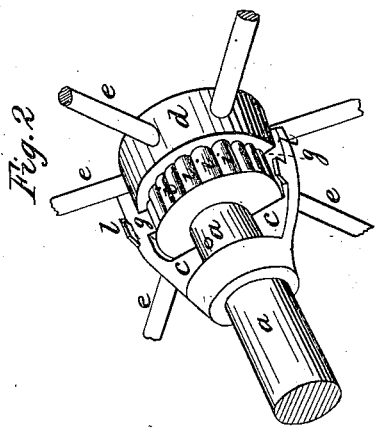
Figure 4:
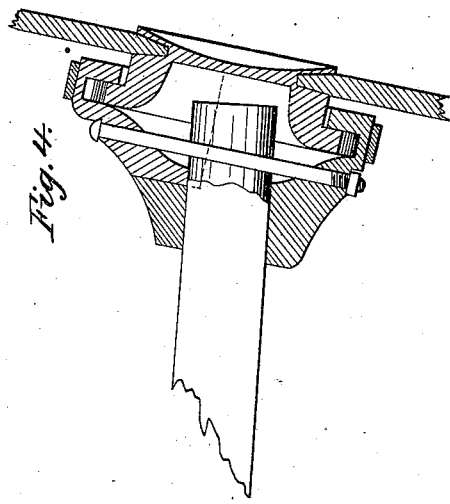
Figure 1:
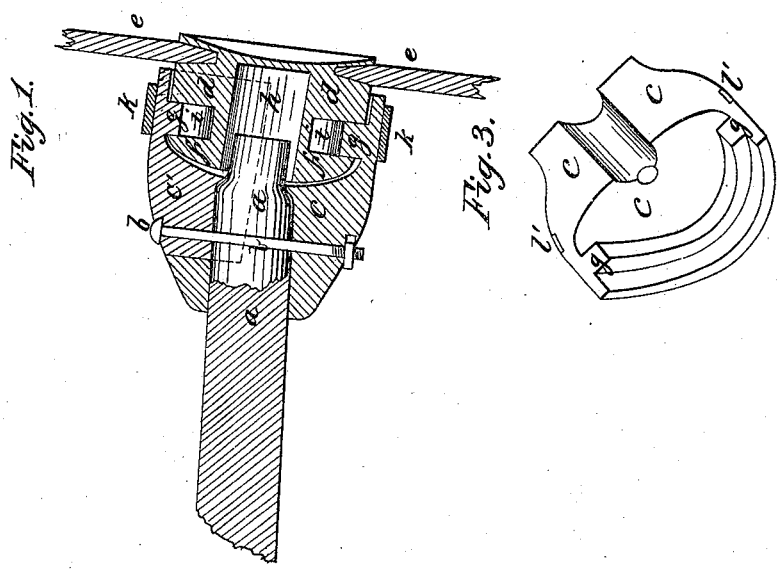
Figure 3:
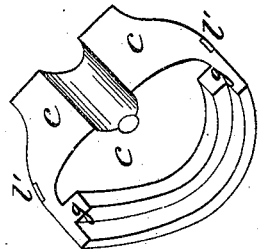

Figure 1 represents a transverse section through the hub box wheel and axle. Fig. 2 a perspective view showing the interior of the hub box by the segmental piece $c'$ being removed. Fig. 3 a perspective of the segment $c'$. Fig. 4 a different shaped hub although of the same principle.

My invention consists in a peculiar arrangement of the hub for axle trees of carriages, etc., by which I accomplish the very desirable and indispensable necessities, in order to obtain a perfect, practicable, cheap, compast easily of draft and safe reliable hub.

The object by which I have acquired this complete device has been solely from study and experience on this subject, and this I have attained as will be clearly seen by close observance of the following description. I have rendered this hub simple compact and light and at the same time applicable to all varieties of conveyance. I avoid the extended portion of the hub which projects from the face of the wheel outward and which is liable to cause very serious accidents, by one wheel coming in contact with another on the thoroughfare. I obviate to a very great extent the friction produced on the axle which necessarily produces an unnecessary amount of draft on the team; and I give strength to the axle at the point of contact with the hub, rather than hew it to fit a small bore in the hub, at the same time giving the wheel the proper pitch, and securing it firmly to the hub, and the hub to the axle. I also render the interior of the hub very accessible and prevent the running off of the wheel, and a mechanic can fit the axle which is perfectly straight to the hub with great ease without the necessity of giving it the perfect taper which, to give the wheel the proper balance on the axle is absolutely necessary in the common form of hub.

To the axle tree $a$, and secured firmly thereon by a bolt $b$ is a hub box $c$, this box is composed of cast iron, and formed of two parts $c$, $c'$ as shown in Fig. 1. The segment $c'$ is made detachable for the purpose of setting in the slotted cylinder $d$ into which the spokes $e$—$e$ are mortised. This cylinder $d$ is made also of cast iron and has an annular slot $f$ cast in it for the purpose of allowing the rim $g$ on the box $c$ to enter, thereby forming a flange for the purpose of securing the cylinder $d$ in its proper place. This cylinder is hollowed out as seen at $h$ Fig. 1 so as to avoid unnecesary weight and the same time to give it the sufficient strength required. A space is left between the rim and the bottom of the slot $f$ in the cylinder $d$ for the reception of friction rollers $i$ $i$ etc. shown in Figs. 1 and 2. These rollers entirely fill up this space left for them and allow the wheel from motion. In addition to the bolt $b$ for securing the parts $c$ $c'$ of the hub box together I brace them, by the employment of a band $k$ which also serves to tighten the parts if they wear loose. The lugs $l$ $l$ fit into recesses $l'$ $l'$ for the purpose of setting the segment in its proper place while placing in the bolt $b$. The desired "cast" of the wheel is given by casting the hole for the reception of the axle out of a true line with the hub as clearly shown in Fig. 1. I have contemplated using different sizes for different vehicles without altering the nature of my invention. One form is shown in Fig. 4 for heavier vehicles and necessarily the parts are much larger and stronger than the one above described which is for light carriages.

I am aware that friction rollers have been used for relieving the friction on the hubs of vehicles and this I do not claim but—

What I do claim and desire to secure by Letters Patent is—

The combination with the axle of vehicles of a segmental box $c$ $c'$, slotted cylinder $d$ and friction rollers $i$, $i$, all arranged and operated as substantially above set forth.

JOSEPH SMITH.

Witnesses:
R. F. CAMPBELL,
JOHN S. HOLLINGSHEAD.